(12) United States Patent
Pihko et al.

(10) Patent No.: US 11,661,703 B2
(45) Date of Patent: May 30, 2023

(54) CELLULOSE BASED FILM STRUCTURE AND METHOD FOR PRODUCING THE SAME

(71) Applicant: Teknologian tutkimuskeskus VTT Oy, Espoo (FI)

(72) Inventors: Riku Pihko, Espoo (FI); Vesa Kunnari, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 123 days.

(21) Appl. No.: 17/346,353

(22) Filed: Jun. 14, 2021

(65) Prior Publication Data

US 2021/0301464 A1   Sep. 30, 2021

Related U.S. Application Data

(62) Division of application No. 16/303,172, filed as application No. PCT/FI2017/050501 on Jul. 4, 2017, now Pat. No. 11,047,091.

(30) Foreign Application Priority Data

Jul. 4, 2016   (FI) ...................... 20165559

(51) Int. Cl.
| | | |
|---|---|---|
| *D21H 11/18* | (2006.01) | |
| *D21F 7/12* | (2006.01) | |
| *B29C 41/28* | (2006.01) | |
| *B29C 41/46* | (2006.01) | |
| *B29D 7/01* | (2006.01) | |
| *B32B 5/26* | (2006.01) | |
| *D21F 7/08* | (2006.01) | |
| *D21F 11/04* | (2006.01) | |
| *D21H 27/10* | (2006.01) | |
| *D21H 27/38* | (2006.01) | |
| *B29K 1/00* | (2006.01) | |
| *B29K 105/12* | (2006.01) | |

(52) U.S. Cl.
CPC ............... *D21F 7/12* (2013.01); *B29C 41/28* (2013.01); *B29C 41/46* (2013.01); *B29D 7/01* (2013.01); *B32B 5/26* (2013.01); *D21F 7/083* (2013.01); *D21F 11/04* (2013.01); *D21H 11/18* (2013.01); *D21H 27/10* (2013.01); *D21H 27/38* (2013.01); *B29K 2001/00* (2013.01); *B29K 2105/124* (2013.01); *B32B 2262/106* (2013.01)

(58) Field of Classification Search
CPC ...... D21H 11/18; D21H 27/10; D21H 19/828; D21H 19/82; D21H 27/38; D21F 9/00; D21F 7/12; D21F 5/044; D21F 3/0272; D21F 7/083; D21F 11/04; D21F 19/826; B29D 7/01; B29C 41/28; B29C 41/46; B32B 5/25; B32B 2262/106
USPC ........................................................ 428/220
See application file for complete search history.

(56) References Cited

U.S. PATENT DOCUMENTS

| | | |
|---|---|---|
| 4,124,677 A | 11/1978 | Saijo et al. |
| 2003/0020208 A1 | 1/2003 | Tasaka et al. |
| 2015/0068973 A1 | 3/2015 | Bessonof et al. |
| 2015/0167249 A1 | 6/2015 | Ono et al. |
| 2017/0266693 A1 | 9/2017 | Vartiainen et al. |
| 2019/0002658 A1 | 1/2019 | Kunnari et al. |
| 2019/0226146 A1 | 7/2019 | Pihko et al. |

FOREIGN PATENT DOCUMENTS

| | | |
|---|---|---|
| CN | 104302834 A | 1/2015 |
| CN | 104321131 A | 1/2015 |
| DE | 102004039913 A1 | 3/2005 |
| EP | 2841649 A1 | 3/2015 |
| JP | 2008209595 A | 9/2008 |
| JP | 2008274525 A | 11/2008 |
| JP | 2010197680 A | 9/2010 |
| JP | 5910390 B2 | 4/2016 |
| WO | WO2009125062 A1 | 10/2009 |
| WO | WO2011010609 A1 | 1/2011 |
| WO | WO2013060934 A2 | 5/2013 |
| WO | WO2013121104 A2 | 8/2013 |
| WO | WO2014147295 A1 | 9/2014 |
| WO | WO2015101711 A1 | 7/2015 |
| WO | WO2015107995 A1 | 7/2015 |

OTHER PUBLICATIONS

SIEMANN: Solvent cast technology—a versatile tool for thin film production. Progr Colloid Polym Sci, 2005, vol. 130, pp. 1-14.

*Primary Examiner* — Mark Halpern
(74) *Attorney, Agent, or Firm* — Laine IP Oy; Mark W. Scott

(57) ABSTRACT

According to an example aspect of the present invention, there is provided a cost-effective method of producing cellulose based films by introducing an intense water removal system to the process, and cellulose based films thereof having improved properties.

8 Claims, 2 Drawing Sheets

CELLULOSE BASED FILM STRUCTURE AND METHOD FOR PRODUCING THE SAME

FIELD

Figure 1:
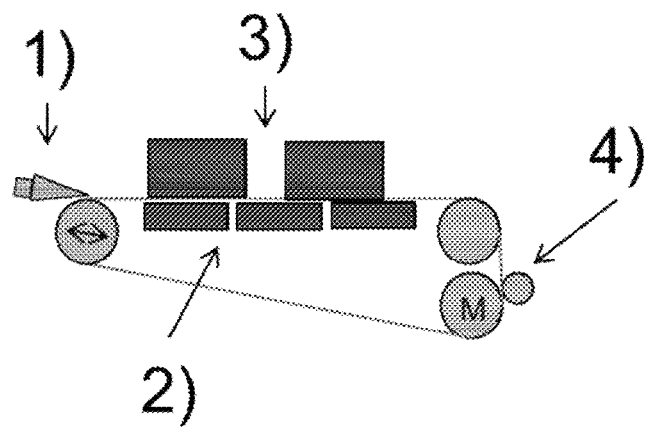

The present invention relates to a method for producing good quality cellulose based films with low production and investment costs by applying novel intense water removal system, and to an improved film produced by such method.

BACKGROUND

In order to produce good quality CNF/CMF films, the film should be casted by applying a low casting solid content. Therefore there is a high amount of water to be removed from the fiber web. Typically, the excess water is removed by evaporation and due to a low solid content this leads to high investment and operation costs in the production line. If water removal by vacuum or pressing is applied, the film structure is attached to a fabric and due to low film strength properties the film structure is damaged during web detachment from the fabric.

In the prior art closest technology relates to PVA or LCD film casting lines, wherein mirror polished metal belts are applied and heated by applying hot air. For example U.S. Pat. No. 4,124,677 describes a method for manufacturing a polyvinyl alcohol films and Siemann (2005) describes typical methods for solvent casting. The problem with these traditional technologies is that the heating of metal belt with hot air is inefficient and thus leads to high production and investments costs. It is for example expensive to produce hot air, and furthermore air is incapable of transmitting enough heat to the metal belt. Air heat transfer to metal belt is also uneven, which leads to difficulties in the process and the products obtained.

Thus, there is need for novel and efficient processes, which consume less energy and produce commercially usable good quality films from for example nanocellulose.

SUMMARY OF THE INVENTION

The invention is defined by the features of the independent claims. Some specific embodiments are defined in the dependent claims.

According to a first aspect of the present invention, there is provided a method for producing continuous cellulose nanofibril (CNF) or cellulose microfibril (CMF) films by introducing a novel intense water removal system.

According to a second aspect of the present invention, the present invention provides means for improving the quality of the produced CNF or CMF films.

These and other aspects, together with the advantages thereof over known solutions are achieved by the present invention, as hereinafter described and claimed.

The method according to an embodiment of the present invention is mainly characterized by what is stated in the characterizing part of claim 1.

The film material according to an embodiment of the present invention is mainly characterized by what is stated in claim 11.

Considerable advantages are obtained by means of the invention. It is provided herein a novel solution, wherein the film is preferably strengthened before, after of simultaneously with casting, after which an intensive water removal is applied. These steps lead to significant decrease in film production investment and operation costs and also to improved film strength and quality properties. For example the production lines can be made essentially shorter than in the traditional processes, and the energy amount typically used for drying the products can be significantly decreased, since a significant amount of moisture is removed before the actual drying step. Also the resulting end-products are of better quality and easily detachable from the support material.

Next, the present technology will be described more closely with reference to certain embodiments.

EMBODIMENTS

The present technology describes a novel method of producing CNF or CMF films, wherein the film is preferably strengthened and intensive water removal is applied.

FIG. 1 is a simplified process scheme comprising 1) casting, 2) adjustable steam heating of metal belt, 3) adjustable impingement drying, and 4) web reeler.

Figure 2:
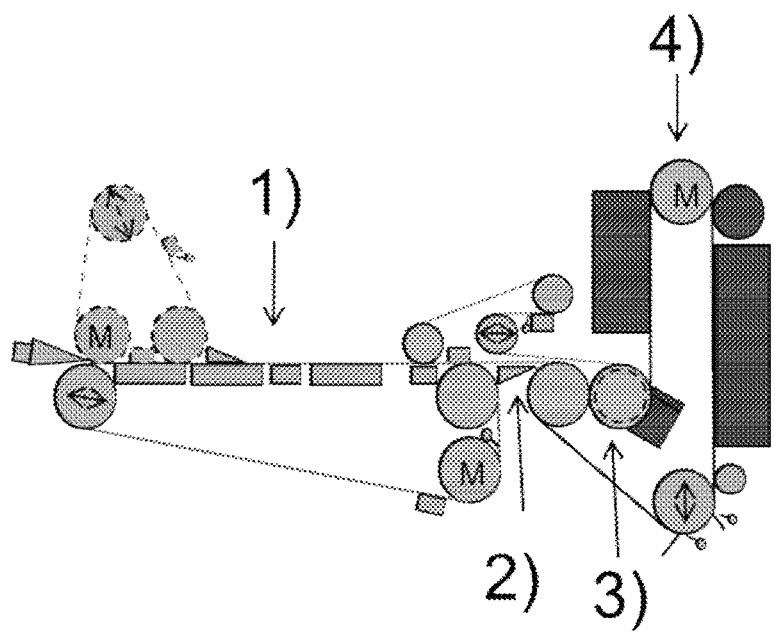

FIG. 2 is a simplified process scheme describing another possible figuration of the production line, wherein section 1) a strengthening layer is being produced, section 2) is responsible for the CNF or CMF layer casting, in section 3) both layers are being combined and water removal is applied, and section 4) comprises web drying and smoothing of the produced film.

Figure 3:
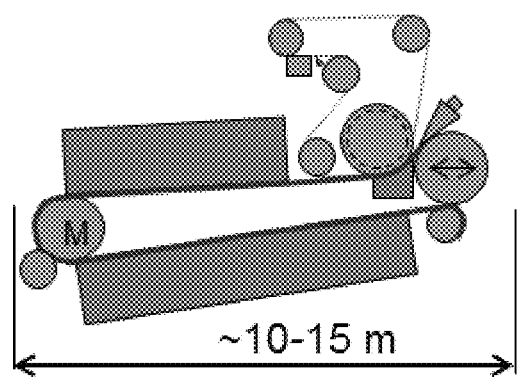

FIG. 3 is a simplified process scheme describing a metal belt pressing and drying machine with a novel heating and pressing chamber and efficient drying for CNF or CMF film manufacturing.

Figure 4:
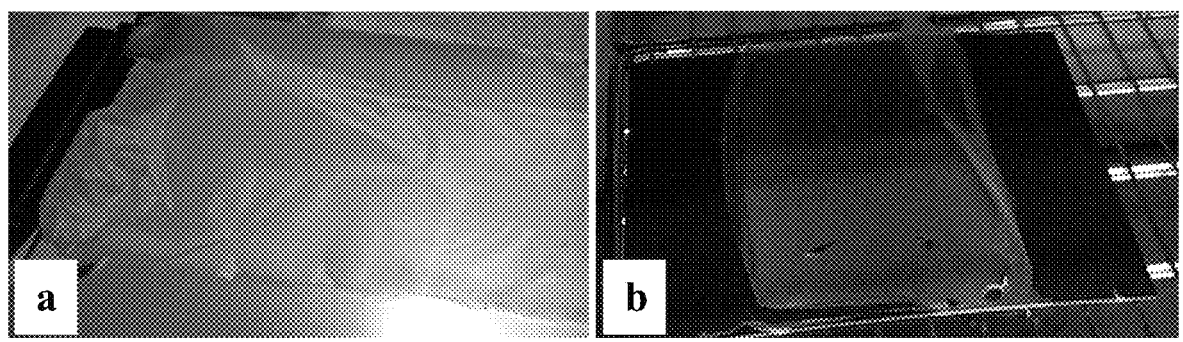

FIG. 4 shows two comparative images of films produced on a metal belt, wherein the surface of the belt has not been treated (a) and (b) has been treated. In (a) the edges of the film tear when the film is dried and the adhesion (3-5 N/m) causes damages to the film when detached from the support. In (b) the edges are clean and the sample is detached from the support without damages (adhesion 1-3 N/m).

According to a preferred embodiment of the present invention, the method for producing continuous cellulose nanofibril (CNF) or cellulose microfibril (CMF) film comprises the steps of:
- casting of CNF or CMF material layer onto a metal belt, fabric or felt having total length of 10 to 150 m,
- removing at least 30% of the moisture of the CNF or CMF material by an intense water removal system, and
- final drying and reeling of the formed film.

According to one embodiment of the present invention, the metal belt, fabric or felt has total length of 10 to 50 m, or even shorter. Short casting lines provide additional savings to the investment costs, and are still proven to result a desired product.

According to a further embodiment of the present invention, the intense water removal system used in the method comprises one or more of the following steps (a) to (c):
(a) slurry temperature increment prior to CNF or CMF material contact with the metal belt, fabric or felt to reach CNF or CMF slurry dryness of 5 to 30% and temperature of 30 to 90° C.,
(b) heated low pressure pulse for gentle water removal right after the CNF or CMF material contact with the metal belt, fabric or felt to reach CNF or CMF dryness of 20 to 50%, and
(c) applying heat to the metal belt from underneath the metal belt right after the film contact with the metal belt in combination with applying impingement drying from above the metal belt after casting,
or any combination of (a), (b) and (c).

It is preferred that the heating medium is steam instead of e.g. air, for example in a low pressure steam chamber. Steam heat is transferred by condensation, which enables more even distribution of the heat compared to air heat.

The impingement drying comprises at least a first blowing speed and a second blowing speed, wherein the first blowing speed is smaller than the second blowing speed. Suitable first blowing speed may be for example 10-30 m/s, whereas the second blowing speed may be for example 30-100 m/s.

According to one embodiment of the present invention the intense water removal system enables a removal of more than 30%, preferably 30 to 50% of the moisture content of the CNF or CMF material prior to final drying.

According to another embodiment of the present invention a strengthening layer is produced on top of the CNF or CMF material before, after or simultaneously with the casting. The strengthening layer consists of longer fibers than the CNF or CMF material. Fibers may be cellulose fibers, such as cellulose nanofibers, but also any other fibers may be used, which preferably have length of 0.1-1 mm.

According to further embodiment of the present invention, the strengthening layer requires at least one filler material, which provides a compact structure together with the fibers. It is also characterizing to the present invention that the strengthening layer is thinner than the CNF or CMF layer. However, it is preferred that the long fiber content of the strengthening layer is bigger compared to the CNF or CMF layer in order to achieve desired wet/dry strength.

Wet/dry strength and stretchability of the web can be highly improved when longer fibers are introduced. Longer fibers can stretch and straighten, which improves handling and further processing properties of the web. On the other hand, longer fibers are not sticking and penetrating into felt or fabric structure during water removal and therefore the web can be detached with a lower force from the fabric surface, which leads to better web quality.

The filler material needs to be finely distributed so that it fills the pores of the fibers, causing a minimum integration of the CNF or CMF layer into the strengthening layer and resulting that the CNF or CMF layer can be kept thin as well. This enables low material costs, because typically CNF or CMF is the most expensive part of the film structure. One example of a suitable filler material is rock.

According to one embodiment of the present invention the strengthening layer is adjusted to thickness of 5 to 30 μm and the CNF layer has adjusted to thickness of 10 to 100 μm. However, strengthening layer is not necessarily required, but has shown to improve the quality of the final product.

Metal belt surfaces can be applied to produce different types of webs and other products. Different products need different adhesion to the metal belt surface. To adjust the adhesion, a controllable surface and/or coating is needed preferably having good wearing properties. By controlling the surface adhesion it is possible to improve the web properties and machine runnability.

According to one embodiment of the invention the surface of the metal belt has been roughened and possibly further coated with flexible material having controlled hydrophobicity and wearing resistant filler. The surface of the metal belt may for example be roughened by grinding and/or blasting to value of Ra 1-3 μm, Rz 1-20 μm, before applying the coating layer onto it. One suitable coating layer comprises fluoropolymer particles. After the coating material has been applied, it needs to be polished. One suitable polishing value is Ra 0.01-1 μm, Rz 0.1-8 μm, depending on the aimed end-use and required adhesion properties thereto.

According to one preferred embodiment of the present invention the adhesion between the film and the metal belt is adjusted to 0.5-5 N/m. It is important that the adhesion is adjusted so that the web remains attached to the metal belt during the production process even if the line is running with high speed, but the web also needs to be gently detachable from the belt surface without damaging the web when the web is being collected and transferred to further processing. The inventors of the present invention have found out that the adhesion level as hereinbefore disclosed and achieved result the desired effects.

According to one embodiment of the present invention, fabric or felt is used instead of metal belt.

In one embodiment of the present invention, after casting of CNF or CMF material layer onto a fabric or a felt, the film is transferred onto a metal belt for intense water removal according to for example FIG. 2.

In a further embodiment of the present invention, a fabric or a felt comprises fibers having diameter of 1 to 2000 μm in at least two layers, which are on top of each other. In addition, the felt may comprise at least one type of slivers having smaller diameter than the fibers. The fabric preferably has a thickness of 1 to 4 mm and the felt preferably has a thickness of 2 to 6 mm. Air permeability of the fabric is preferably at least 300 cfm, and of the felt preferably at least 1 $m^3/m^2$/min at 100 Pa in a non-pressurized space.

In one embodiment of the present invention, the layers of a fabric or a felt facing the CNF or CMF layer are denser and/or have smaller open volume than the other side of the fabric or the felt.

According to a further embodiment the present invention can be applied for processes running with high speeds. Such speeds may be for example over 500 m/min, or even higher, for a film structure having a basis weight of 20-200 $g/m^2$ and width of 3-10 m.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The word film in this document refers also to other possible web types like fiber webs (paper, tissue, board), membranes, printed electronic platforms, composites etc.

INDUSTRIAL APPLICABILITY

At least some embodiments of the present invention find industrial application in areas relating to film manufacturing and packaging industry, such as for barrier applications, membranes, medical or food packaging use, automotive applications, and printed electronics.

EXAMPLES

Example 1—Preparation of Cellulose Nanofiber Material Prior Casting

CNF/CMF material slurry having solids of 4-20% was mixed with stretchability and adhesion properties improving additives (e.g. sorbitol, sizes and starch). Part of the water and/or air bubbles were removed from the slurry by pressure filtering and vacuum mixing to reach a solids level of 5-30% prior to casting. In combination with this step, temperature of the slurry can be increased applying steam heating to 40-90° C. to improve material flow, water removal, evenness, and fast evaporation properties.

Example 2—Preparation of Strengthening Layer

CNF/CMF film layer was precise casted on metal belt surface. Strengthening material layer was manufactured by precise casting on CNF/CMF layer and/or by pressure feeding the strengthening material onto a permeable fabric, through which the excess water is removed by vacuum and/or pressing elements to form the strengthening layer. Strengthening material consists mainly of 0.1-1 mm long fibers and possible filler material and possible strengthening additives (e.g. sizes, starch and sorbitol). Strengthening layer and CMF/CNF film layers were combined prior or after the intensive water removal stage in order to produce a strengthened film. Sizes or other additives can be applied in together with the connection of the layers to improve properties of the formed strengthened film.

Example 3—Surface Treatment of Metal Belt for Controlled Web Adhesion

Metal belt surface was treated with grinding stone or belt to form mainly machine direction or 5-50° angle compared to machine direction oriented grooves that have depth and width of 0.01-20 μm. Adhesion between the metal belt and the web was adjusted by changing the amount, size, and orientation of the grooves. In addition to the previous, ground surface was coated with 1-50 μm coating thickness flexible material having controlled hydrophobicity and wearing resistant filler. The coated surface can also be ground to surface roughness of Ra 0.01-1 μm, where the final surface will consist of metal (ground metal belt surface top areas) and hydrophobic coating (ground metal belt surface groove bottom areas). The adhesion between the film and the metal belt was adjusted to a level of 0.5-5 N/m.

Example 4—Method for Producing Cellulose Nanofiber Film

CNF/CMF film was produced by a method including one or more of the following steps:
Water removal and/or CNF/CMF temperature increment prior to casting to reach casting solids of 5-30% applying a pressurized filtering and a continuous shear force mixing method and/or heating the slurry using steam,
In MD and CD direction precise controlled casting unit head was applied to form an even film layer on metal belt,
Metal belt was heated by adjustable low pressure steam where steam was condensed on the back surface of the metal belt and the starting point of the heating was arranged close to the point where the film is casted on the metal belt,
Water was removed from the film by a low pressurized and steam heated water removal zone that has an effective length of at least 1 m,
Water was removed from the film by an adjustable impingement drying where below the film solids of 40%, the air speed is 10-30 m/s and above solids of 40% the air speed is 30-100 m/s,
Film was smoothened and thickness profile was adjusted applying a smooth roll in contact with the film where the smoothing roll is arranged against the metal belt or in a step where a pair of smoothing rolls are arranged after the metal belt drying,
Film was detached or reeled after the metal belt drying step.

CITATION LIST

Patent Literature

U.S. Pat. No. 4,124,677

Non Patent Literature

Ulrich Siemann, Solvent cast technology—a versatile tool for thin film production, Progr Colloid Polym Sci (2005), vol. 130, pp. 1-14, DOI: 10.1007/b107336.

The invention claimed is:

1. A film comprising:
   a cellulose nanofibril (CNF) or cellulose microfibril (CMF) layer comprising a CNF or CMF material, and
   a strengthening layer on a surface of the CNF or CMF layer, the strengthening layer comprising at least one filler material and comprising longer fibers than the CNF or CMF material of the CNF or CMF layer,
   wherein the strengthening layer is thinner than the CNF or CMF layer.

2. The film according to claim 1, wherein the CNF or CMF layer comprises a thickness of 10-100 μm.

3. The film according to claim 2, wherein the strengthening layer comprises a thickness of 5 to 30 μm.

4. The film according to claim 1, wherein the fibers of the strengthening layer comprise cellulose fibers.

5. The film according to claim 1, wherein the fibers of the strengthening layer have a length of from 0.1 to 1 mm.

6. The film according to claim 5, wherein the fibers of the strengthening layer having a length of from 0.1 to 1 mm comprise cellulose nanofibers.

7. The film according to claim 1, wherein the film comprises a cellulose nanofibril (CNF) layer.

8. The film according to claim 1, wherein the film comprises a cellulose microfibril (CMF) layer.

* * * * *